United States Patent [19]
Patel et al.

[11] Patent Number: 5,777,545
[45] Date of Patent: Jul. 7, 1998

[54] REMOTE CONTROL APPARATUS FOR POWER LINE COMMUNICATIONS SYSTEM

[75] Inventors: Chandrakant Bhailalbhai Patel, Hopewell, N.J.; Joseph Robert Ader, Yardley, Pa.; Henry Charles Klein, West Chester, Pa.; John Artman, Berwyn, Pa.

[73] Assignee: Elcom Technologies Corporation, Malvern, Pa.

[21] Appl. No.: 825,147

[22] Filed: Mar. 26, 1997

Related U.S. Application Data

[63] Continuation of Ser. No. 437,941, May 9, 1995, abandoned.

[51] Int. Cl.[6] ................................................ H04M 11/04
[52] U.S. Cl. ................................ 340/310.06; 340/310.01; 340/310.08
[58] Field of Search .......................... 340/310.01, 310.02, 340/310.03, 310.04, 310.05, 310.06, 310.07, 310.08, 825.69, 825.72; 455/352, 353, 151.2; 375/219, 257

[56] References Cited

U.S. PATENT DOCUMENTS

| | | |
|---|---|---|
| 3,852,722 | 12/1974 | Neuville . |
| 4,200,862 | 4/1980 | Campbell et al. . |
| 4,367,548 | 1/1983 | Cotten, Jr. et al. . |
| 4,394,691 | 7/1983 | Amano et al. . |
| 4,420,841 | 12/1983 | Dudash . |
| 4,475,209 | 10/1984 | Udren .................................. 340/310.07 |
| 4,509,211 | 4/1985 | Robbins . |
| 4,980,665 | 12/1990 | Schotz .................................. 340/310.02 |
| 5,214,422 | 5/1993 | Cullimore . |

FOREIGN PATENT DOCUMENTS 55-133153  10/1980  Japan .

OTHER PUBLICATIONS

International Search Report.

Xantech advertisement for MDM70 IR Remote Control Modem.

*Primary Examiner*—Thomas Mullen
*Assistant Examiner*—Nina Tong
*Attorney, Agent, or Firm*—Ratner & Prestia

[57] ABSTRACT

Remote control apparatus for a power line communications system in which control signals are transmitted, via the power line to, from the location of utilization equipment to a control unit located at a remote point and by which the utilization equipment is controlled.

5 Claims, 1 Drawing Sheet

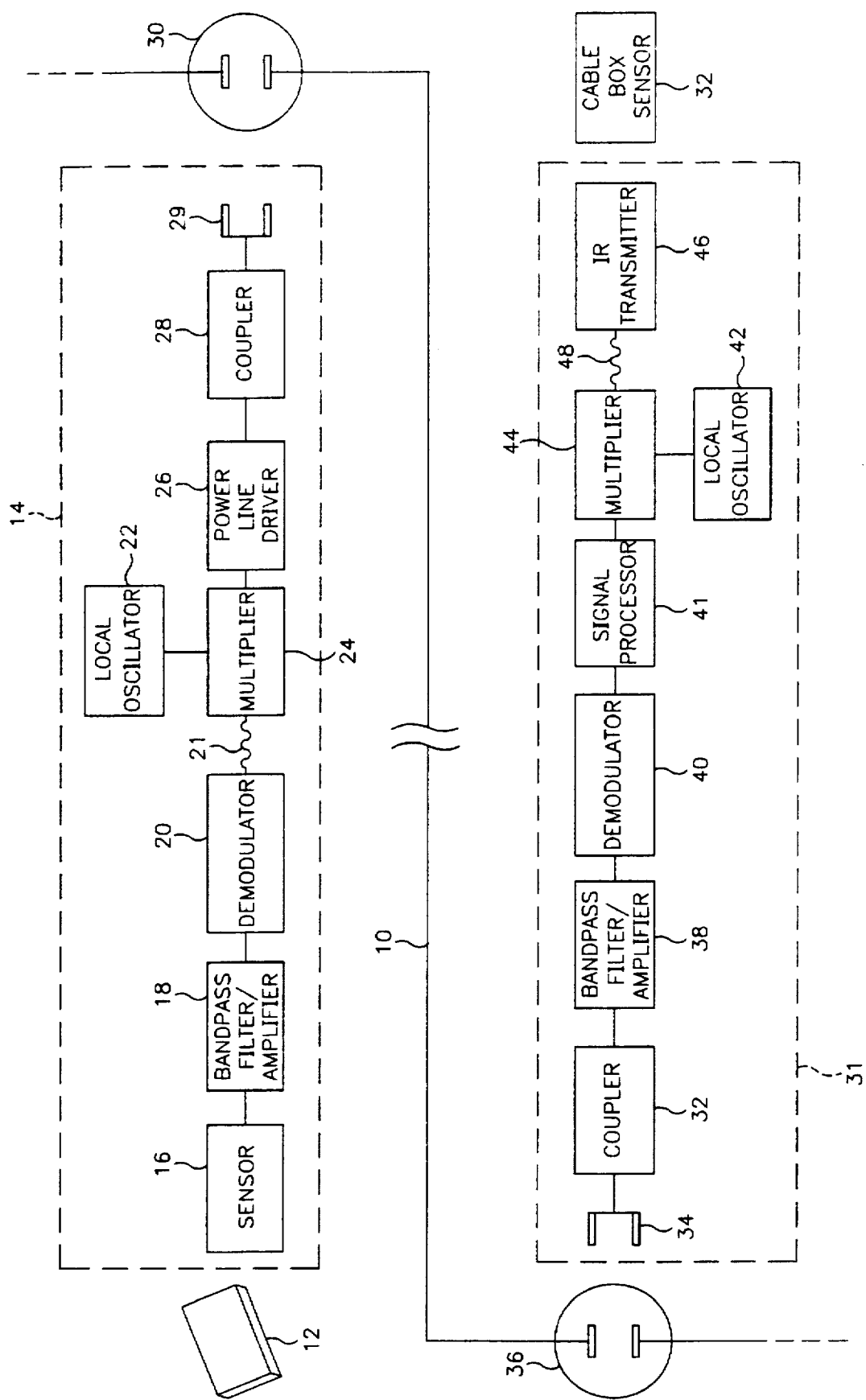

REMOTE CONTROL APPARATUS FOR POWER LINE COMMUNICATIONS SYSTEM

This application is a continuation of application Ser. No. 08/437,941 filed May 9, 1995, now abandoned.

TECHNICAL FIELD

The present invention relates, in general, to the communication of information along power lines and, in particular, to the remote control of utilization equipment connected to a power line.

BACKGROUND OF THE INVENTION

The lines by which power is distributed in a building can be and are used for the transmission of information signals between rooms within a building. For example, cable television signals delivered to a building can be transmitted to a plurality of television sets in the building by the power lines in the building from a single cable control box positioned at a convenient location such as the cable input point.

Typically, a television set is operated by a remote controller which transmits coded infrared signals which are sensed by an infrared sensor on the television set to change a setting (e.g. the channel to be viewed) of the television set. With cable television service and operation of the television set by means of a cable control box, the cable control box typically is positioned in proximity to the television set and the cable control box is operated by a remote controller of generally similar design to a remote controller for a television set. If the cable control box is located remote from the television set and out of the range of the remote controller, as for example when a single cable control box is used as the signal source for a plurality of television sets which receive the signals via the power lines in a building, means must be provided to change the setting of the cable control box to permit operation of the remote controller without the need to go to the cable control box and be within the range of the remote controller.

SUMMARY OF THE INVENTION

According to the present invention, remote control apparatus for a power line communication system includes a power line and a control unit for transmitting a first code modulated control signal. This apparatus also includes a first transmitter/receiver and a second transmitter/receiver. The first transmitter/receiver includes means for sensing the first code modulated control signal, means for demodulating the first code modulated control signal to develop a first code control signal, means for modulating a first carrier signal with the first code control signal to develop a second code modulated control signal, and means for coupling the second code modulated control signal from the first transmitter/receiver to the power line for transmission of the second code modulated control signal along the power line. The second transmitter/receiver includes means for coupling the second code modulated control signal from the power line to the second transmitter/receiver, means for demodulating the second code modulated control signal to develop a second code control signal which is substantially identical to the first code control signal, means for modulating a second carrier signal with the second code control signal to develop a third code modulated control signal, and means for transmitting the third code modulated control signal. Remote control apparatus for a power line communication system, constructed in accordance with the present invention, further includes means for sensing the third code modulated control signal.

While the present invention will be described in connection with the remote control of a television cable control box, remote control apparatus for a power line communications system, constructed in accordance with the present invention, has broader application and can be used to control other types of utilization equipment.

BRIEF DESCRIPTION OF THE DRAWINGS

The single FIGURE is a block diagram of remote control apparatus for a power line communications system constructed in accordance with the present invention.

DETAILED DESCRIPTION OF THE INVENTION

Referring to the drawing, remote control apparatus for a power line communication system, constructed in accordance with the present invention, includes a power line 10 and a control unit 12 for transmitting a first code modulated control signal. Control unit 12 can be a conventional remote controller for a television set or a cable television control box which transmits a pulse code modulated infrared signal. Such signals generally have 0.5 ms wide pulses with a maximum repetition rate of 1 ms. A wide range of encoding schemes are used by various manufacturers to encode volume control, channel selection, and other operating functions and settings of the equipment. These schemes typically encode 8 to 32 bits of digital information with most using some form of redundancy to ensure reception in the event of an interrupted transmission. The baseband pulse code modulated signal, referred to herein as the first pulse code control signal, is then used to modulate a carrier and the resultant signal, referred to herein as the first pulse code modulated control signal, is transmitted through the air using an infrared diode. The carrier frequency of a broad variety of commercially available infrared remote controllers is in the 32 KHz to 56 KHz range, with most manufacturers using a carrier within the 38 KHz to 40 KHz range or about 38 KHz.

The remote control apparatus shown in the drawing also includes a first transmitter/receiver 14 by which the information in the first pulse code modulated control signal transmitted by control unit 12 is conducted to power line 10. In particular, it is necessary to shift the carrier frequency so that the carrier frequency is in a frequency range which permits transmission along power line 10 yet below the 40 MHz upper limit of operation of power line communications systems set by the government.

Transmitter/receiver 14 has a sensor 16 for sensing the first pulse code modulated control signal transmitted by control unit 12. For infrared signals transmitted by controller 12, sensor 16 is an infrared phototransistor. Generally, commercially available infrared receivers, by which electronic equipment is controlled by a remote controller, respond to carrier frequencies over the entire range of 32 KHz to 56 KHz. Thus, if transmitter/receiver 14 is designed to receive a selected baseband signal modulated on, for example, a 38 KHz carrier, transmitter/receiver 14 will respond properly even if the actual carrier frequency is not 38 KHz.

Transmitter/receiver 14, shown in the drawing, also has a bandpass filter/amplifier 18 for bandpass filtering the first pulse code modulated control signal to assure passage of only this signal and for amplifying this signal to a sufficient level.

Transmitter/receiver 14 also has a demodulator 20 for demodulating the first pulse code modulated control signal sensed by sensor 16 to develop a first code control signal.

Demodulator 20 serves to detect the first pulse code control signal (i.e. the baseband pulse code modulated signal) from its carrier signal.

Sensor 16, bandpass filter amplifier 18, and demodulator 20 can be arranged as a unit which is positioned in proximity to a television set. Curved line 21, extending from the output of demodulator 20, represents a cable by which the demodulator is connected to the remainder of transmitter/receiver 14 which is arranged for positioning at an outlet connected to power line 10 and to be plugged into this outlet.

Transmitter/receiver 14 further has a local oscillator 22 and a multiplier 24 for modulating a first carrier signal supplied by local oscillator 22 with the first pulse code control signal (i.e. the baseband pulse code modulated signal) to develop a second pulse code modulated control signal. This second pulse code modulated control signal has a carrier frequency in a frequency range which permits transmission along power line 10 yet below the 40 MHz upper limit of operation of power line communications systems set by the government.

Transmitter/receiver 14, shown in the drawing, also has a power line driver 26 which amplifies and bandpass filters the second pulse code modulated control signal.

Transmitter/receiver 14 also has a coupler 28 for coupling the second pulse code modulated control signal from transmitter/receiver 14 to power line 10 by way of a plug 29 and an outlet 30, connected to the power line, for transmission of the second pulse code modulated control signal along the power line. Coupler 28 provides isolation, impedance matching and filtering.

The remote control apparatus shown in the drawing also includes a second transmitter/receiver 31 by which the information in the second pulse code modulated control signal transmitted along power line 10 is transmitted to a cable television box sensor 32. In particular, it is necessary to shift the carrier frequency of the second pulse code modulated control signal so that the carrier frequency of the signals transmitted to cable television box sensor 32 are in a range which permits their reception and processing by the cable television box sensor.

Transmitter/receiver 31 has a coupler 33 for coupling the second pulse code modulated control signal from power line 10 to transmitter/receiver 32 by way of a plug 34 and an outlet 36 connected to the power line. Coupler 33 provides isolation, impedance matching and filtering.

Transmitter/receiver 31, shown in the drawing, also has a bandpass filter/amplifier 38 for assuring passage of only the second pulse code modulated control signal and for amplifying this signal to a sufficient level.

Transmitter/receiver 31 also has a demodulator 40 for demodulating the second pulse code modulated control signal to develop a second code control signal which is substantially identical to the first code control signal. Demodulator 40 serves to detect the second pulse code control signal (i.e. the baseband pulse code modulated signal) from its carrier signal.

Transmitter/receiver 31, shown in the drawing, also has a signal processor 41 which sharpens the pulses in the second pulse code control signal (i.e. the baseband pulse code modulated signal).

Transmitter/receiver 31 further has a local oscillator 42 and a multiplier 44 for modulating a second carrier signal supplied by local oscillator 42 with the second pulse code control signal (i.e. the baseband pulse code modulated signal) to develop a third pulse code modulated control signal. This third pulse code modulated control signal has a carrier frequency (e.g. 38 KHz) in a range (e.g. 32 KHz to 56 KHz) which permits its reception and processing by cable television box sensor 32.

Transmitter/receiver 31 also has an infrared transmitter 46 for transmitting a third pulse code modulated infrared control signal through the air. Cable television box sensor 32, in proximity to infrared transmitter 46, senses and processes the third pulse code modulated infrared control signal transmitted by infrared transmitter 46 in the usual manner and changes the setting (e.g. channel to be viewed) in response to the pulse code control signal. Curved line 48, extending between multiplier 44 and infrared transmitter 46, represents a cable by which the infrared transmitter, located in proximity to cable television box sensor 32, is connected to the remainder of transmitter/receiver 31 which is arranged for positioning at outlet 36 and to be plugged into this outlet.

While in the foregoing there has been described a preferred embodiment of the present invention, it should be understood by those skilled in the art that various modifications and changes can be made without departing from the true spirit and scope of the present invention.

What is claimed:

1. A remote control apparatus for a power line communication system comprising:

a power line;

a first signal transmitter for transmitting a first pulse code modulated control signal having one of a plurality of carrier frequencies;

a first transmitter/receiver including:
   (1) sensing means for sensing said first pulse code modulated control signal and other pulse code modulated control signals having other carrier frequencies within the plurality of carrier frequencies,
   (2) means for demodulating said first pulse code modulated control signal to develop a first pulse code control signal,
   (3) means for pulse code modulating a first carrier signal with said first pulse code control signal to develop a second pulse code modulated control signal, and
   (4) means for coupling said second pulse code modulated control signal from said first transmitter/receiver to said power line for transmission of said second pulse code modulated control signal along said power line;

a second transmitter/receiver including:
   (1) means for coupling said second pulse code modulated control signal from said power line to said second transmitter/receiver,
   (2) means for pulse code demodulating said second pulse code modulated control signal to develop a second pulse code control signal substantially identical to said first pulse code control signal,
   (3) means for modulating a second carrier signal with said second pulse code control signal to develop a third pulse code modulated control signal, and
   (4) a second signal transmitter for transmitting said third pulse code modulated control signal; and a sensor for sensing said third pulse code modulated control signal.

2. A remote control apparatus according to claim 1 wherein:

(a) said first signal transmitter is an infrared signal transmitter which transmits a first pulse code modulated infrared control signal as said first pulse code modulated control signal.

(b) said first transmitter/receiver sensing means includes an infrared sensor, (c) said second transmitter/receiver transmitting means includes an infrared signal transmitter which transmits a second pulse code modulated infrared control signal as said third pulse code modulated control signal, and (d) said means for sensing said third pulse code modulated control signal includes an infrared sensor.

3. A remote control apparatus according to claim 2 wherein said first pulse code modulated control signal and said second pulse code modulated control signal each includes a carrier frequency in the 32 KHz to 56 KHz range modulated by a pulse code.

4. A remote control apparatus according to claim 3 wherein said carrier frequency of said first pulse code modulated control signal and said second pulse code modulated control signal is 38 KHz.

5. A remote control apparatus according to claim 2 wherein:

(a) said first transmitter/receiver further includes:
  (1) means for bandpass filtering and amplifying said first pulse code modulated control signal, and
  (2) means for amplifying and bandpass filtering said second pulse code modulated control signal, and (b) said second transmitter/receiver further includes:
  (1) means for bandpass filtering and amplifying said second pulse code modulated control signal, and
  (2) means for sharpening the pulses in said second pulse code control signal.

* * * * *